March 17, 1953 M. E. MOHR 2,632,147

COMMUNICATION SYSTEM EMPLOYING PULSE CODE MODULATION

Filed Feb. 9, 1949 3 Sheets-Sheet 1

INVENTOR
M. E. MOHR
BY George C. Lord
ATTORNEY

March 17, 1953 M. E. MOHR 2,632,147

COMMUNICATION SYSTEM EMPLOYING PULSE CODE MODULATION

Filed Feb. 9, 1949 3 Sheets-Sheet 2

INVENTOR
M. E. MOHR
BY George C. Lord
ATTORNEY

INVENTOR
M. E. MOHR
BY George C. Ford
ATTORNEY

Patented Mar. 17, 1953 2,632,147

UNITED STATES PATENT OFFICE 2,632,147

COMMUNICATION SYSTEM EMPLOYING PULSE CODE MODULATION

Milton E. Mohr, New Providence, N. J., assignor to Bell Telephone Laboratories, Incorporated, New York, N. Y., a corporation of New York Application February 9, 1949, Serial No. 75,347

6 Claims. (Cl. 332—11)

This invention relates to pulse code modulation systems and particularly to coders and decoders therefor.

In communication systems utilizing what is known as pulse code modulation or PCM, a speech wave or other signal to be transmitted is sampled periodically to ascertain its instantaneous amplitude which is then expressed by a permutation pulse code analogus to a telegraph code. Such codes employed groups of pulses each of a fixed number of pulses or pulse intervals. An advantageous code of this type analogous to the conventional printing telegraph code is one employing on-off pulses, that is, a two-value code. Such a code has a certain maximum advantage in discriminating against noise. Codes employing pulses of more than two values can be used and are often advantageous in certain applications.

These permutation codes are analogous to numeration systems in that each code element in each of its values represents a certain definite component amplitude of the total range of amplitudes that may be expressed by the code and the component amplitude represented by the same values of adjacent code elements bear a ratio to each other equal to the number of possible values of the code elements in the particular code used.

One classification of pulse code modulation system is on the basis of the number of possible values assigned to each code element and because of the analogy to the numeration systems of corresponding bases such types of systems may be designated by similar terms, that is, binary, ternary, etc. With any code the total number of permutation obtainable is equal to $m_n$ where $m$ is the number of possible values assigned to each code element and $n$ is the number of code elements.

Since the number of different amplitudes that can be represented by any code is determined by the number of code elements used, it is impossible to truly represent the amplitude samples since they may be of an infinite number of values. Accordingly, the continuous range of amplitude values of which the transmitted signal is capable is divided into a fixed number of continuous ranges together encompassing the total range. Each of the constituent amplitude ranges is then represented by an individual one of the permutations of the code, and signal amplitudes falling within the limits of any constituent range are treated as a single amplitude. This process is called quantizing.

As previously indicated, the binary code employing on-off pulses gives a maximum advantage in discrimination against noise. On the other hand for a given number of quantizing steps or amplitude values, it requires the greatest number of code elements or pulses of any of the permutation codes. Since the band width requirements are directly proportional to the number of code elements or pulses whether these be transmitted on a time division basis or otherwise, the use of this code also requires the greatest band width. For many applications of pulse code modulation, it is accordingly necessary to balance the factors of noise advantage, band width, and quality as determined by the number of quantizing steps, in the choice of the code to be used.

It is an object of the present invention to provide coders and decoders suitable for use in pulse code modulation systems employing code elements of two or more values.

In accordance with the present invention the coder comprises a cathode ray tube having a number of targets, one corresponding to each constituent amplitude range or quantized step. The cathode ray beam is deflected by the signal so that it will fall on the target that corresponds to the amplitude of the signal. The code element pulses are produced by the beam current flowing through appropriate impedance units, one corresponding to each element of the code. Where the code employs pulses of more than two values, the impedance elements are tapped to produce pulses of appropriate values. Each target is connected through isolating resistors to the appropriate tap on the code element impedance unit so that the effect of the beam impinging on any target will be to produce the particular code element pulses indicative of that amplitude step.

In a decoder in accordance with this invention, a storage condenser is provided and a charge corresponding to the amplitude represented by each received code group is built up on the condenser. For this purpose, separate charging circuits are provided for each code element and the circuits are so arranged that the charge supplied to the condenser by each is proportional to the components of signal amplitudes represented by the respective code elements. In the case of a binary code, the effect of each code element pulse will be merely to turn on or off the respective charging circuits depending upon the value of the received pulse, that is, whether it is an on or an off pulse. In the case of systems employing pulses of possible values greater than two, the effect of a received pulse will be to control the supply of appropriate multiples of the respective charge to the condenser.

The invention may be more completely understood by reference to the following detailed description of the embodiments thereof illustrated in the drawing, in which.

Figure 1:
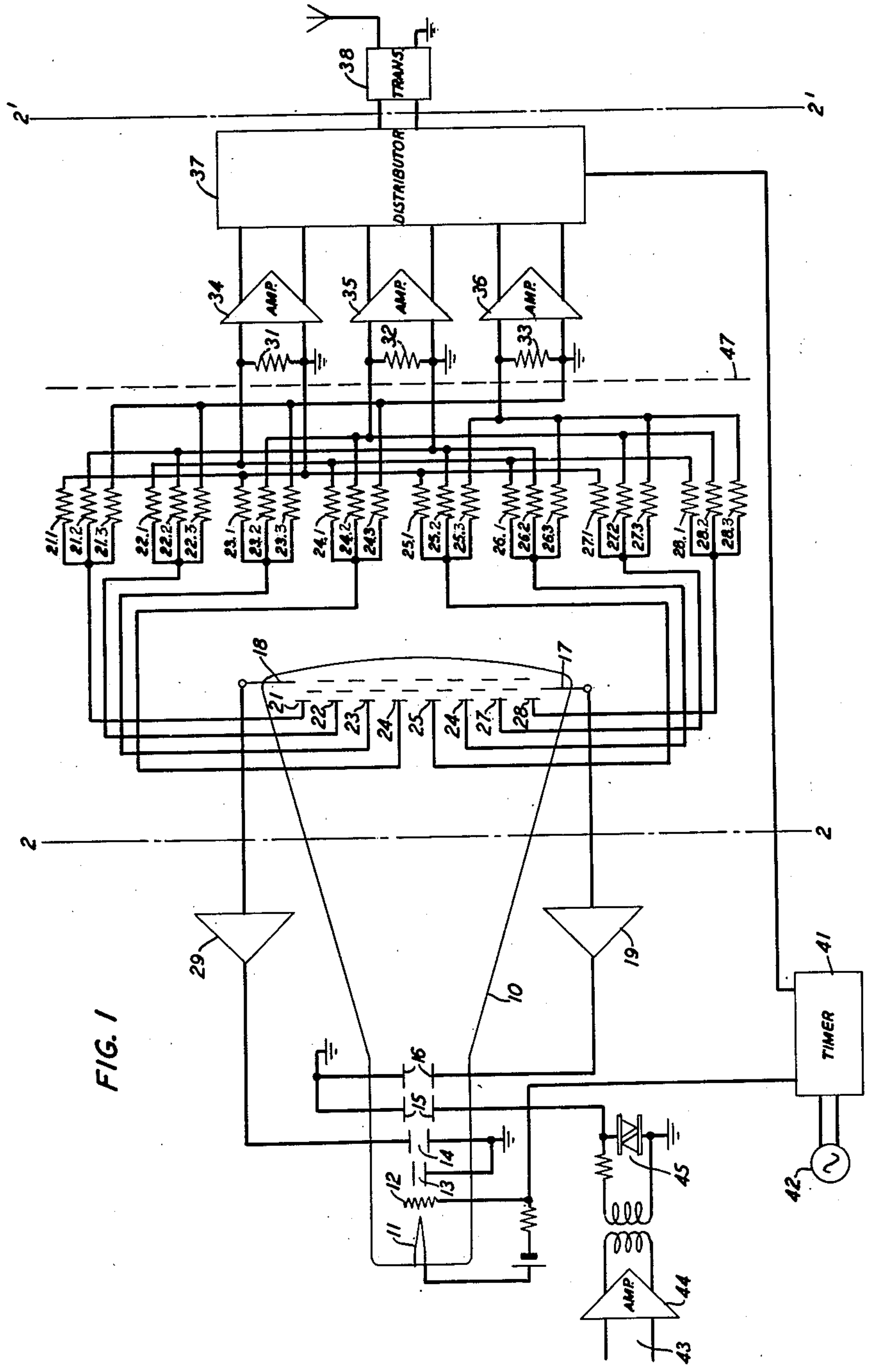
Fig. 1 is a schematic drawing of a coder for operating with a binary code.

In the coder of Fig. 1 there is provided a cathode ray tube 10 having conventional beam forming and control electrodes comprising a cathode 11, a grid 12, a beam forming or accelerating electrode 13 and pairs of deflecting plates 14, 15 and 16. For the purposes of producing the required pulse code, there is provided an array of target electrodes 21 to 28, along which the cathode beam is deflected in accordance with the amplitude of the signals impressed on the deflecting electrode 15.

The tube is provided with a grid structure and appropriate circuits to prevent any ambiguity in the beam position or drift of the beam from one target to another. This structure comprises a pair of back plates or grids 17 and 18 each having a series of conducting slats staggered with respect to the row of targets 21 to 28 so that the slats of grid 17 overlap the lower edges of the targets 21 to 28 and extend part way across the intertarget space while the slats of grid 18 overlap the upper edges of the targets and extend across the remainder of the intertarget space. If there is considered a condition in which the beam is drifting downward off the lower edges of a target, it will be observed that it will strike one of the slats of the grid 17. For the opposite condition in which the beam is drifting upward, it will strike one of the slats of the grid 18.

In the following discussion the operation of the tube 10 assumes that secondary emission from the target areas is small and that the potentials of the targets due to the impinging beam of electrons is negative. This need not be so, however, and techniques well known in the design of tubes of this type, may be applied to use a large secondary emission ratio if desired. In this case the potential of the targets due to an impinging beam would be positive and it would be necessary to provide a phase turnover in the associated amplifiers.

Grid 17 is connected through a cathode follower amplifier 19 to the ungrounded plate of the deflecting pair of plates 16. When the beam strikes one of the slats of the grid 17, the negative voltage fed back through the amplifier 19 to the deflecting plate 16, tends to cause the beam to be deflected upward. This action holds the beam in register with the target against any tendency to drift in the downward direction.

Similarly, the grid 18 is connected through a cathode follower amplifier 29 to the deflecting plate 14. Consequently, if the beam should tend to move upward off any target, it would strike one of the slats of the grid 18 and cause a negative voltage to be fed back to the deflecting plate 14 moving the beam in a downward direction and preventing any tendency of the beam to drift upward.

Thus by the combined action of the two back grid electrodes 17 and 18, the beam is trapped on a particular target until the feedback loop is interrupted either by cutting off the beam or by opening the feedback path. In the particular embodiment illustrated herein, the action is affected by interrupting the beam as will be described later. Upon such an interruption the beam is free to be positioned on any target under control of the signal voltage applied to the deflecting plates 15.

While in the system illustrated herein, the control of the beam against drift in the two opposite directions is effected by connecting the two back electrodes to deflecting plates on opposite sides of the beam, an equivalent system for obtaining the same result is to apply the feedback voltages to the same deflecting plates with their phase inversion in one feedback path. This general system of beam control with the equivalent modification just described is disclosed and claimed in applicant's copending application Serial No. 637,414 filed December 27, 1945.

Targets 21 to 28 are connected to the output resistors 31, 32 and 33 through suitable isolating resistors 21.1, 21.2, 21.3, 22.1 etc. As a result, code element pulses are produced by the electron beam current in those output circuits in which a target electrode is connected through suitable isolating resistors to the upper terminal of an output resistor. In the particular system shown, the code employs three code elements giving eight quantized amplitude steps represented by the eight targets 21 to 28. The correlation between the quantized amplitude steps and the code element pulses will be readily appreciated from the following table showing the interconnection between the target electrode and the output resistors, "1" indicating a connection and "0" no connection, i. e., a connection to the grounded terminal:

| Target | Output Resistors | | |
|---|---|---|---|
| | 31 | 32 | 33 |
| 21 | 0 | 0 | 0 |
| 22 | 1 | 0 | 0 |
| 23 | 0 | 1 | 0 |
| 24 | 1 | 1 | 0 |
| 25 | 0 | 0 | 1 |
| 26 | 1 | 0 | 1 |
| 27 | 0 | 1 | 1 |
| 28 | 1 | 1 | 1 |

For the zero or grounded connection condition, no pulse will be produced in the output, which condition is called an off pulse. For the connections indicated by the numeral 1, a pulse is produced by the beam current flowing through the respective output resistor, which condition is called an on pulse. The table accordingly shows not only the connections to the targets but also the signal pattern produced when the beam impinges on each.

The resistance of the isolating resistors 21.1, 21.2, 21.3, 22.1, etc. are equal and very large compared to the resistance of the output resistors 31, 32 and 33. Also, as will be observed, an isolating resistor is provided in each ground connection of each target. Accordingly the beam current flowing to any target splits essentially equally between the three circuits connected to it. Assuming, for example, that the beam falls on the target 23, the current then splits three ways between the resistors 23.1, 23.2, and 23.3. That flowing through resistors 23.1 and 23.3 passes directly to ground producing no output. That flowing through resistor 23.2 also flows through output resistor 32 producing a voltage drop thereacross and accordingly an input to the connected amplifier 35. The signal pattern produced in accordingly an off pulse in the output of amplifier 34 connected to resistor 31, an on pulse in the output of amplifier 35 connected to resistor 32, and an off pulse in the output of amplifier 36 connected to resistor 33. This corresponds to the signal pattern shown in the table for a beam deflection such as to impinge on target 23.

The signals or code elements may be transmitted by any type of multiplex system and as shown in the drawing time division multiplex operation is employed. For this purpose the outputs of the amplifiers 34, 35, and 36 are connected to a distributor 37 capable of operating at rates required for systems of the present type, for example, a cathode ray tube distributor. The resulting output from the distributor 37, comprising the code element pulses arranged in their desired sequences corresponding to the time division channels determined by the distributor, is impressed on the radio transmitter 38. There the pulses control the production of corresponding pulses of radio waves.

The operation of the system is controlled from the base frequency oscillator 42 the frequency of the output of which is such that the rate which the signal is sampled is more than twice the highest required component frequency of the signal. The output of the oscillator is supplied to the timing circuit 41 in which wave forms as required for the sampling control and the operation of the distributor 37 are produced.

As previously indicated, the signal is applied to the deflecting plates 15. For this purpose the voice currents from the telephone line 43 are amplified in the amplifier 44 and compressed in the instantaneous compressor 45. As is understood in the art, the effect in this type of system, a compressor in combination with a complementary expander at the receiver or decoder, is to reduce the distortion due to quantizing. A similar compression effect can be achieved by a non-linear spacing of the target electrodes 21 to 28 but in general the use of a conventional compressor as a separate circuit element is preferable.

In the operation of the system a short negative pulse from the timing circuit 41 occurring once each sampling cycle or frame is applied to the grid 12 of the cathode ray tube 10. This blanks the beam for the duration of the pulse, consequently, releasing the holding action of the quantizing grids 17 and 18. At the termination of this control pulse the beam is reestablished and takes up a position on one of the targets 21 to 28 determined by the amplitude of the signal applied to the deflecting plates 15. During the remainder of the sampling period or frame (or that part thereof assigned to the particular channel for multiplex systems) the signal pulses determined by the output circuits connected to the particular target are produced by the distributor 37. At the beginning of the next frame another pulse is supplied to the grid 12 and the action repeated.

While the embodiment of the invention shown in Fig. 1 employs a code of only three code elements, it will be understood that codes of larger numbers of elements may be used and that the particular arrangement shown is chosen only for the purpose of illustrating the invention which is not limited thereby. In fact since a three-element code gives only eight quantizing steps, systems for transmitting high quality speech will in general require a larger number of code elements. Also with the particular arrangement of circuit elements shown in the drawing, a large number of output leads through the envelope of the tube 10 are required. This situation will be further exaggerated by the use of codes giving larger numbers of quantizing steps. This difficulty may be alleviated by mounting the isolating resistors (22.1, 22.2, etc.) within the envelope of the tube. With such an arrangement, all the apparatus between the tube and the dotted line 47 would be mounted within the tube. This greatly reduces the number of leads that must be brought out, particularly when it is noted that the grounded leads may be combined into a single lead.

It is also to be understood that any code character can be associated with any target, the systematic arrangement shown being only illustrative.

Figure 2:
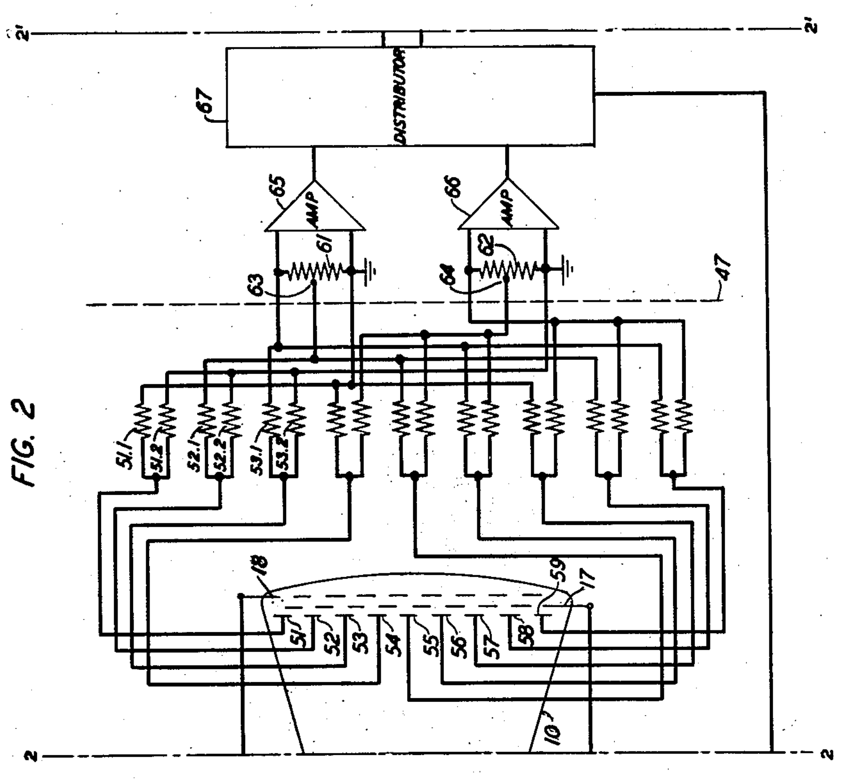
Fig. 2 is a schematic drawing of a modification of the coder of Fig. 1 to permit operation with a ternary code.

Fig. 2 shows how the system of Fig. 1 may be modified for operation with a code employing code element pulses of three different amplitudes or signaling conditions. In the particular arrangement shown, provisions are made for a three-valued or ternary code employing two code elements and giving nine quantized steps. It will be obvious from a consideration of this showing, how the principles of the invention may be extended to a code of any number of elements each of any desired number of possible values.

In particular, Fig. 2 shows a modification of that portion of the circuit of Fig. 1 between the dash-dot lines 2 and 2'. In this modification the cathode ray tube 10 is provided with nine target electrodes 51 to 59. These are connected through suitable isolating resistors 51.1, 51.2, 52.1 etc. to the two output resistors 61 and 62. In this case each of the output resistors 61 and 62 is provided with a mid-point tap, 63 and 64, respectively. Since, as in the case of the system of Fig. 1, the isolating resistors 51.1, 51.2, 52.1, etc. have resistances which are very high compared with the resistances of the output resistors 61 and 62, current flowing from the beam through any of the circuits connected to the target electrodes 51 to 59 will be substantially equal. Consequently, the voltage produced across the output resistor 61 by a circuit connected to tap 63, will be one-half of the voltage produced by a circuit connected to the upper terminal of the resistance 61 and similarly for resistance 62.

The following table shows the interconnections between the target electrodes 51 to 59 and the output resistors 61 and 62 and at the same time the pulse signals or codes produced for representing signal amplitudes producing deflections of the beam to the respective targets. In this table 0 represents a connection to the grounded terminal of an output resistor and the absence of the code element pulse; 1 represents a connection to the mid-tap of an output resistor and a code element pulse of amplitude 1; and 2 a connection to the upper terminal of an output resistor and a code element pulse of amplitude 2:

| Target | Output Resistors | |
|---|---|---|
| | 61 | 62 |
| 51 | 0 | 0 |
| 52 | 1 | 0 |
| 53 | 2 | 0 |
| 54 | 0 | 1 |
| 55 | 1 | 1 |
| 56 | 2 | 1 |
| 57 | 0 | 2 |
| 58 | 1 | 2 |
| 59 | 2 | 2 |

It is to be observed that, like the system of Fig. 1, the systematic arrangement of the code characters is merely illustrative as any code character can be associated with any target by suitable interconnection.

Signal pulses produced across the resistors 61 and 62 are amplified in the respective amplifiers 65 and 66 and supplied to a distributor 67 that operates in a manner similar to the distributor 37 of the system of Fig. 1.

Figure 3:
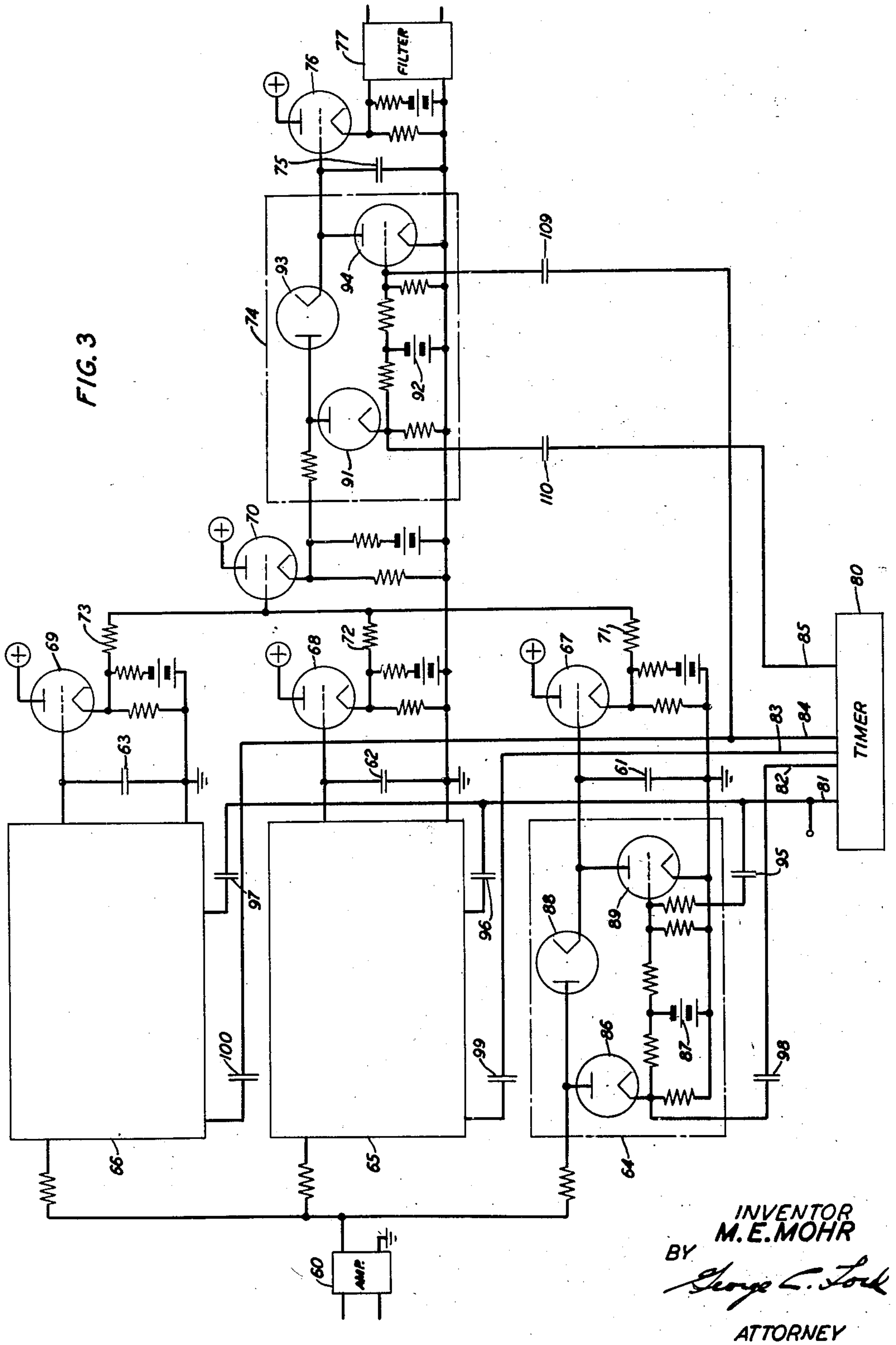
Fig. 3 is a schematic drawing of a decoder for a binary code system.

Fig. 3 shows a circuit for receiving and decoding the pulse code signals transmitted from the coder of Fig. 1. This circuit operates by weighting the code element pulses of any code group and combining the weighted pulses to produce a sample signal proportional to the sample at the transmitter represented by the code group. The received signals after detection and amplification in a conventional radio receiver are supplied to a pulse amplifier 60 where they are amplified and shaped, being regenerated if necessary. The output of the amplifier is supplied in parallel to three circuits, one for each code element. These circuits comprise the storage capacitors 61, 62 and 63 which function as code element storage units. These capacitors are connected to the output of the amplifier 60 through the respective clamps or electronic switches 64, 65 and 66 which operate to select the respective code element pulses. For this purpose the clamps 64, 65 and 66 must be operated at the proper times to select the respective code element pulses to which they are assigned. Since the circuit structure of the three clamps is identical only that of clamp 64 is shown in detail and will be described later.

The capacitors 61, 62 and 63 are connected to the grids of the vacuum tubes 67, 68 and 69, respectively, which operate by virtue of their respective series output resistors 71, 72 and 73 to weight the pulses stored on the capacitors. The pulses in their weighted values are supplied in parallel to the grid of the tube 70 which is operated as a cathode follower amplifier and supplies a voltage representing the combined weighted values of the pulses through the clamp 74 to the capacitor 75 which functions as a sample storage unit.

The capacitor 75 is connected to the grid of a vacuum tube 76 which is operated as a cathode follower amplifier for amplifying the signal and in the output of which there is connected a low-pass filter 77 having a cut-off frequency equal to or slightly lower than the sampling frequency at the transmitter and which accordingly eliminates all signal components introduced by the sampling process.

A timer 80 is provided for supplying pulses for the control of the decoder, the required pulses being taken off through the output leads 81 to 85. The timer 80 must, of course, operate synchronously with the timer at the transmitter and in general this requires the use of some type of synchronizing means. The operation of the decoder will first be described on the assumption that the timer 80 is synchronized with the timer at the transmitter.

Each of the clamps 64, 65 and 66 of which 64 is typical comprises a shunt diode 86 the cathode of which is normally biased negatively by a voltage supplied from the battery 87 through appropriate resistors. In this way, the diode 86 is normally conducting and acts as a short circuit preventing any pulses from being supplied to the storage capacitor 61 except when a positive control pulse is supplied to the cathode of the diode 86 as will be later described. A second diode 88 is connected in the lead to the storage capacitor 61 to permit the selected pulse to charge the capacitor while preventing it from discharging through the diode 86 during other portions of the cycle. A triode 89 has its space path connected in shunt to the capacitor 61. Under normal conditions the space path of the triode 89 is non-conducting due to the negative biasing voltage supplied to the grid from the battery 87. During the resetting period a positive pulse is applied to the grid of the triode 89 to render the tube conducting thus discharging the capacitor 61 as will be later described.

The clamp 74 provided for controlling the sample storage capacitor 75 is essentially the same as the clamps 64, 65 and 66, but the circuit is shown in detail herein for the reason that it is operated in a slightly different manner. This clamp comprises the shunt diode 91, the series diode 93 and the discharging triode 94. A battery 92 provides the bias for maintaining the diode 91 normally conducting and the triode 94 normally non-conducting.

Figure 4:
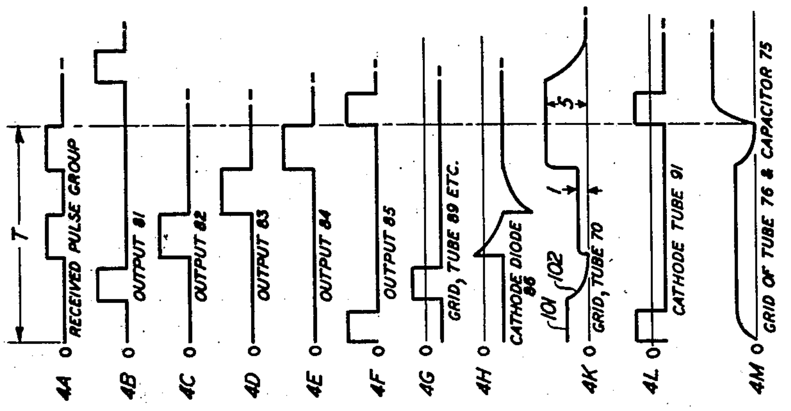
Fig. 4 is a series of graphs indicating the operation of the decoder.

The operation of the decoder will now be described in detail for a single received pulse code group. In this connection reference will be made to the graphs of Fig. 4 which show the wave form at various points in the circuit and will be found helpful in the consideration of the operation. Fig. 4A shows the output of the amplifier 60 for the assumed pulse code group comprising the signal pattern on-off-on. (This pulse code group or signal pattern corresponds to the pulse code group produced by a signal which causes a deflection of the cathode beam to the target 25 on the basis that the distributor 37 operates to transmit the pulses produced by the resistors 31, 32 and 33 in the order named.) The time T represents a single frame or sampling period. It will be observed that the pulse code group as shown here occupies approximately three-fifths of this period. Obviously, if codes of a larger number of pulses or if multiplex operation is employed the pulses would be considerably shorter with respect to the frame time.

The graphs of Figs. 4B, 4C, 4D, 4E and 4F show the pulse outputs from the terminals 81 to 85, respectively, of the timer 80.

For reasons which will later appear obvious the operation of the circuit will be described beginning with the pulse from terminal 81 which may be termed the resetting pulse. This pulse is shown in Fig. 4B. It is supplied through the coupling capacitors 95, 96 and 97 to the respective clamps 64, 65 and 66. Each of these capacitors has a large capacity and consequently the pulse will appear on the grid of the respective discharge tubes substantially the same shape as shown in Fig. 4B. As will be observed from a consideration of the detailed circuit of clamp 64, the effect of the pulse is to drive the grid of the tube 89 positive, rendering the tube conductive, and permitting the condenser 61 to discharge. Similar action in the clamps 65 and 66 permits the discharge of the respective capacitors 62 and 63. This action may be observed from a consideration of the graph 4K showing the grid voltage of the tube 70 which is the result of the combined charges on the capacitors 61, 62 and 63. The portion 101 of this curve shows the voltage resulting from the charges produced on these capacitors from the previous code group. During the portion of the curve 102 the capacitors are discharged through the tube 89 and the corresponding tubes of the clamps 65 and 66 so that the grid of the tube 70 reaches its normal value of zero.

Next, the pulse from the timer terminal 82 (graph 4C) is supplied to the cathode of tube 86 through the coupling capacitor 98 which has such a capacity that the pulse 4C is partially differentiated. This causes the voltage of the tube 86 to follow the wave form shown in the graph 4H. When the cathode is driven positive by the pulse produced by the leading edge of pulse 4C, the diode 86 is rendered non-conducting so that it no longer has a shunting effect in the clamp circuit. As a result the first code element pulse charges the capacitor 61 through the diode 88.

When the voltage at the cathode of diode 86 becomes sufficiently negative again diode 86 conducts causing the potential on the plate of 88 also to become negative relative to its cathode. Thus, diode 88 is also non-conducting and since triode 89 is also non-conducting the charge on capacitor 61 remains fixed.

During the second pulse period the control pulse from terminal 83 is applied to open the clamp 65. However, since during this pulse interval no pulse is received, the signaling condition being off under the assumed condition, no charge is stored in the condenser 62. During the third pulse interval the control pulse from the terminal 84 is applied to open the clamp 66 and the received pulse charges the capacitor 63.

The pulses are weighted by weighting the effect of the charges on the capacitors 61, 62 and 63 in their effect on the common amplifier tube 70. The weighting is effected by the respective cathode follower amplifier tubes 67, 68 and 69 in combination with their respective series output resistors 71, 72 and 73. For this purpose the resistor 72 has a resistance which is one-half that of resistor 71 and resistor 73 has a resistance which is one-quarter that of resistor 71. The result of this arrangement is that a charge on capacitor 61 will produce on the grid of tube 70 a voltage of one unit, a charge on capacitor 62 will produce a voltage of two units, and a charge on capacitor 63 will produce a voltage of four units, the charges produced on these capacitors by the respective on pulse all being equal.

For the particular conditions assumed for the illustrative example, the effect on the grid of the tube 70 may be observed from graph 4K. Thus the charge on the capacitor 61 provided by the first pulse produces a voltage on the grid of tube 70 of one unit. In the second pulse interval, no pulse is present to charge the capacitor 62, consequently this voltage does not change during the second pulse interval. However, during the third pulse interval, the capacitor 63 becomes charged and a voltage of four units is added to the single unit voltage provided by the capacitor 61, thus bringing the total voltage on the grid of tube 70 to five units.

During the sampling period the voltage on the grid of the tube 70 is transferred to the capacitor 75. This action takes place during the sampling pulse from the terminal 85 which is shown in the graph 4F. A complete understanding of this action requires a further consideration of the operation taking place during the third pulse interval. The pulse from the terminal 84 that is supplied to the clamp 66 during this third pulse interval is also supplied to the grid of the tube 94 through the coupling capacitor 109 which has a large capacity permitting the pulse to be impressed upon the grid substantially without change. This pulse renders the tube 94 conducting and permits the sample charge on the capacitor 75 from the previous code group to be discharged. This action may be observed from a consideration of the graph 4M. As a result, at the time of the sampling pulse from the terminal 85, the condenser 75 is fully discharged. The effect of impressing the sampling pulse from the terminal 85 on the cathode of the diode 91 is to block the diode and thus open the clamp circuit permitting the capacitor 75 to charge to a value determined by the voltage on the grid of the tube 70 as will be observed from a consideration of the graphs 4L and 4M.

The resulting voltage on the signal amplifier tube 76 will be a series of pulses determined by the successive pulse code groups. This series of pulses is integrated in the filter 77 that also operates to filter out any components due to the sampling rate, that is, the rate of occurrence of the pulses on the capacitor 75. The resulting output from the filter 77 will accordingly be a substantial replica of the signal waves applied at the input of the transmitter.

The type of decoder circuit of Fig. 3 is not limited to use with two valued codes but is readily adaptable for operation with any of the permutation codes. In the use of a ternary code as used with the coder of Fig. 2 where the pulses are zero (off), one unit, or two units, the charges supplied to the code element storage units (61, 62 and 63) will depend upon the value of the received pulse; that is, the charge will be either of a one unit or two units. Consequently, the weighted pulse supplied to the combining amplifier (70) will vary accordingly. Of course, the series resistors (71, 72 and 73) of the weighting amplifiers must bear a ratio determined by the code used. Thus where in the particular circuit of Fig. 2 they are related in the ratio of the powers of 2 for a binary (two valued code), for a ternary (three valued code) they will be related in the ratio of the powers of 3.

What is claimed is:

1. In a communication system for transmitting a message wave, a coder for producing permutation code groups of pulses representative of the instantaneous amplitude of the message wave, said code groups comprising a number, $n$ of pulses each of any of a number $m$ of signaling conditions, a cathode-ray tube having a plurality of targets equal to the number of elementary amplitude ranges ($m^n$) provided by the system, means for establishing a cathode-ray beam for deflecting said beam in accordance with the instantaneous amplitude of the message wave, a circuit corresponding to each of the $n$ pulses of the code groups, connections from the respective targets to said circuits for establishing a circuit condition corresponding to one of the $m$ signaling conditions in the respective circuit, and means responsive to the circuit condition of said circuits for producing pulses of the respective signaling conditions representative of the signaling amplitude corresponding to the target.

2. In a communication system employing permutation code groups of pulses for representing the instantaneous amplitude of a message wave to be transmitted, each code group comprising the same number of pulses each pulse being of any of a plurality of different signaling conditions, means for producing an electron beam, means for deflecting said beam in accordance with the instantaneous amplitude of the message wave, a plurality of electrodes in the path of deflection of said beam, a plurality of pulse establishing circuits, one for each pulse of the code groups and each having an input terminal corresponding to each of said plurality of different signaling conditions, and circuit connections from each of said electrodes to those terminals of each of said circuits corresponding to the signaling conditions assigned to the respective electrodes and the instantaneous amplitude that it represents.

3. A combination according to claim 2 in which the combination of connections from the terminals of said pulse establishing circuits to each electrode is different.

4. In a combination system employing permutation code groups of pulses representing the instantaneous amplitude of a message wave to be transmitted, each code group comprising the same number of pulses, each of any of a plurality of different signaling conditions, means for producing an electron beam, means for deflecting said beam in accordance with the instantaneous amplitude of the message wave, a plurality of electrodes in the path of deflection of said beam, and a circuit arranged to be completed by said beam corresponding to each pulse of said code groups and connected to each electrode, said circuits so differing in their transmission characteristics, with respect to the electrodes and to the pulses, as to produce pulse groups of a different combination of signaling conditions for each electrode.

5. In a communication system, a coder for producing permutation code groups of pulses each group representing the instantaneous amplitude of a message wave to be transmitted and comprising a number $n$ of pulses of any of a number $m$ of separate signaling conditions and comprising means for producing a cathode-ray beam, means for deflecting said beam in accordance with the instantaneous amplitude of the message wave, means for defining a plurality of positions in the path of deflection of said beam, one of said positions corresponding to each of the amplitude values $m^n$ provided by the coding system, and means including the cathode beam for establishing from each of said positions a circuit corresponding to each of the $n$ pulses and to that particular one of the $m$ signaling conditions required for the respective pulse in the code group representing the amplitude value corresponding to that beam position.

6. In a communication system employing permutation code groups of pulses for representing the instantaneous amplitude of a message wave to be transmitted, each code group having the same number of off or on pulses, means for producing an electron beam, means for deflecting said beam in accordance with the instantaneous amplitude of the message wave, a plurality of electrodes in the path of deflection of said beam, a plurality of pulse output circuits, and interconnecting circuits for completing a circuit for the electron beam current from certain predetermined targets through certain predetermined pulse output circuits to produce on pulses in said predetermined pulse output circuits so that a different permutation of on and off pulses is produced for each target, off pulses corresponding to those pulse output circuits not included in the circuit for the electron beam current from the respective target.

MILTON E. MOHR.

REFERENCES CITED

The following references are of record in the file of this patent:

UNITED STATES PATENTS

| Number | Name | Date |
|---|---|---|
| 2,013,671 | Roe | Sept. 10, 1935 |
| 2,114,255 | Powell | Apr. 12, 1938 |
| 2,139,655 | Allensworth | Dec. 13, 1938 |
| 2,207,744 | Larson | July 16, 1940 |
| 2,224,677 | Hanscom | Dec. 10, 1940 |
| 2,458,652 | Sears | Jan. 11, 1949 |
| 2,463,535 | Hecht | Mar. 8, 1949 |
| 2,473,691 | Meacham | June 21, 1949 |
| 2,483,400 | Clark | Oct. 4, 1949 |
| 2,552,619 | Carbrey | May 15, 1951 |